US011769100B2

(12) United States Patent
Sinha et al.

(10) Patent No.: US 11,769,100 B2
(45) Date of Patent: Sep. 26, 2023

(54) LEADING INDICATORS AND MONITOR BUSINESS KPIS AND METRICS FOR PREEMPTIVE ACTION

(71) Applicant: ADOBE INC., San Jose, CA (US)

(72) Inventors: Atanu Sinha, Bangalore (IN); Manoj Kilaru, Telangana (IN); Iftikhar Ahamath Burhanuddin, Bengaluru (IN); Aneesh Shetty, Navi Mumbai (IN); Titas Chakraborty, Navi Mumbai (IN); Rachit Bansal, Sangrur (IN); Tirupati Saketh Chandra, Andhra Pradesh (IN); Fan Du, Milpitas, CA (US); Aurghya Maiti, West Bengal (IN); Saurabh Mahapatra, Sunnyvale, CA (US)

(73) Assignee: ADOBE, INC., San Jose, CA (US)

( * ) Notice: Subject to any disclaimer, the term of this patent is extended or adjusted under 35 U.S.C. 154(b) by 50 days.

(21) Appl. No.: 17/329,934

(22) Filed: May 25, 2021

(65) Prior Publication Data

US 2022/0383224 A1 Dec. 1, 2022

(51) Int. Cl.
*G06Q 10/0639* (2023.01)
*G06F 18/214* (2023.01)
*G06F 18/2321* (2023.01)

(52) U.S. Cl.
CPC ..... *G06Q 10/06393* (2013.01); *G06F 18/214* (2023.01); *G06F 18/2321* (2023.01)

(58) Field of Classification Search
CPC ........... G06Q 10/06393; G06K 9/6226; G06K 9/6256
See application file for complete search history.

(56) References Cited

U.S. PATENT DOCUMENTS

2008/0201397 A1* 8/2008 Peng ................. G06Q 10/0639
705/7.36
2012/0173399 A1* 7/2012 Chen ................... G06Q 10/067
705/348

(Continued)

FOREIGN PATENT DOCUMENTS

CN 109711714 A * 5/2019
CN 111915892 A * 11/2020
WO WO-2019051701 A1 * 3/2019 ............. H04N 5/232

OTHER PUBLICATIONS

"Analyzing Construction Safety Through Time Series Methods", Houchen Cao and Yang Miang Goh, Department of Building, School of Design and Environment, National University of Singapore, 4 Architecture Dr., 117566, Singapore. Front. Eng. Management 2019, 6(2): 262-274. (Year: 2019).*

(Continued)

*Primary Examiner* — Pan G Choy
(74) *Attorney, Agent, or Firm* — F. CHAU & ASSOCIATES, LLC

(57) ABSTRACT

Systems and methods for data analytics are described. One or more embodiments of the present disclosure receive target time series data and candidate time series data, where the candidate time series data includes data corresponding to each of a plurality of candidate metrics, train a prediction network to predict the target time series data based on the candidate time series data by setting temporal attention weights corresponding to a plurality of rolling time windows and by setting candidate attention weights corresponding to the plurality of candidate metrics, identify a leading indicator metric for the target time series data from the plurality of candidate metrics based on the temporal attention weights and the candidate attention weights, and signal the leading indicator metric for the target time series data.

17 Claims, 6 Drawing Sheets

(56) References Cited

U.S. PATENT DOCUMENTS

| | | | | |
|---|---|---|---|---|
| 2013/0063264 | A1* | 3/2013 | Oktem | G06F 16/122 706/50 |
| 2018/0218269 | A1* | 8/2018 | Oliner | G06F 16/26 |
| 2018/0300621 | A1* | 10/2018 | Shah | G06N 3/044 |
| 2020/0159203 | A1* | 5/2020 | Shetty B | G05B 23/0283 |

OTHER PUBLICATIONS

Talebi et al., "Finding Leading Indicators of Fatigue in Operational Data Sets", Department of Mining Engineering, University of Utah, Salt Lake City, UT 84112, USA 2021. (Year: 2021).*

Babecky et al., "Leading Indicators of Crisis Incidence Evidence from Developed Countries", European Central Bank, Working Paper Series No. 1486 / Oct. 2012. (Year: 2012).*

Stock et al., "Forecasting with Leading Indicators: Lessons from the 1990 Recession in the United States", Prepared for the meeting of the Ekonomiska Radet, Konjunkturinstitutes, Stockholm, Sweden. Oct. 5-6, 1992. (Year: 1992).*

Gregorova et al., "Learning Predictive Leading Indicators for Forecasting Time Series Systems with Unknown Clusters of Forecast Tasks", Geneva School of Business Administration, HES-SO University of Applied Sciences of Western Switzerland. Proceedings of Machine Learning Research 77: 161-176, 2017. (Year: 2017).*

"Leading Indicator Series"; Found on the internet: https://fred.stlouisfed.org/tags/series?t=leading+indicator.

"The Yield Curve as a Leading Indicator"; Found on the internet: https://www.newyorkfed.org/research/capital_markets/ycfaq.html#/.

Schrage, et al., "Leading With Next-Generation Key Performance Indicators", Jun. 26, 2018; Found on the internet: https://sloanreview.mit.edu/projects/leading-with-next-generation-key-performance-indicators/.

McGuckin, et al., "The Composite Index of Leading Economic Indicators: How To Make It More Timely", Aug. 2001, 32 pages.

Stock, et al., "New Indexes of Coincident and Leading Economic Indicators" NBER macroeconomics annual, 4, 351-394 (1989).

Mostaghimi, "Monetary Policy, Composite Leading Economic Indicators and Predicting the 2001 Recession", Journal of Forecasting, 23(7), 463-477, (2004).

Borden, et al., "Gauging internal efficiency and effectiveness with leading and lagging indicators"; Found on the internet: https://www.mckinsey.com/business-functions/operations/our-insights/gauging-internal-efficiency-and-effectiveness-with-leading-and-lagging-indicators.

Pai, et al., "A hybrid ARIMA and support vector machines model in stock price forecasting", Omega, 33(6), 497-505, (2005).

Petneházi, "Recurrent Neural Networks for Time Series Forecasting", arXiv preprint arXiv:1901.00069v1 [cs.LG] Jan. 1, 2019, 22 pages.

11Guo, et al., "Exploring Interpretable LSTM Neural Networks over Multi-Variable Data", arXiv preprint arXiv:1905.12034v1 [cs.LG] May 28, 2019, 17 pages.

* cited by examiner

LEADING INDICATORS AND MONITOR BUSINESS KPIS AND METRICS FOR PREEMPTIVE ACTION

BACKGROUND

The following relates generally to data analytics, and more specifically to identifying leading indicators.

Data analysis, or analytics, is the process of inspecting, cleaning, transforming and modeling data. In some cases, data analytics systems may include components for discovering useful information, collecting information, informing conclusions and supporting decision-making. Data analysis can be used to make decisions in a business, government, science or personal context. Data analysis includes a number of subfields including data mining and business intelligence. In a statistical context, data analysis includes descriptive statistics, exploratory data analysis (EDA), and confirmatory data analysis (CDA).

Identifying leading indicators is a subfield of data analysis. For example, in cases of business data analytics, leading indicators are often used to assist business decision and forecasting. Business decision-makers depend on leading indicators to predict target key performance indicators (KPIs) such as orders or revenue. Additionally, business entities rely on these leading indicators to make strategic decisions such as new market expansion and allocation of resources.

Conventional data processing systems predict target time series based on large datasets and are not applicable to fast-changing time series data. Therefore, there is a need in the art for improved data processing systems that are robust to fast-changing environment and can make predictions based on a windowed subset of candidate time series data.

SUMMARY

The present disclosure describes systems and methods for data analytics. Some embodiments of the disclosure include a data processing apparatus configured to identify a leading indicator metric for target time series data from a large set of candidate metrics. For example, a machine learning model (i.e., a data processing network) is trained based on segmented candidate time series data (e.g., using rolling time windows). The trained network is then configured to calculate a lead time associated with the leading indicator metric. In some cases, a set of leading indicators are combined to form a composite leading indicator based on temporal attention weights and candidate attention weights. In some examples, the data processing network includes a two-level hierarchy architecture comprising a temporal attention head and a candidate attention head.

A method, apparatus, and non-transitory computer readable medium for data analytics are described. One or more embodiments of the method, apparatus, and non-transitory computer readable medium include receiving target time series data and candidate time series data, wherein the candidate time series data includes data corresponding to each of a plurality of candidate metrics, training a prediction network to predict the target time series data based on the candidate time series data by setting temporal attention weights corresponding to a plurality of rolling time windows and by setting candidate attention weights corresponding to the plurality of candidate metrics, identifying a leading indicator metric for the target time series data from the plurality of candidate metrics based on the temporal attention weights and the candidate attention weights, and signaling the leading indicator metric for the target time series data.

An apparatus and method for data analytics are described. One or more embodiments of the apparatus and method include a prediction network configured to predict target time series data based on candidate time series data corresponding to each of a plurality of candidate metrics, a training component configured to train the prediction network by updating temporal attention weights corresponding to a plurality of rolling time windows and candidate attention weights corresponding to the plurality of candidate metrics, and a leading indicator component configured to identify a leading indicator metric for the target time series data from the plurality of candidate metrics based on the temporal attention weights and the candidate attention weights.

A method, apparatus, and non-transitory computer readable medium for training a network are described. One or more embodiments of the method, apparatus, and non-transitory computer readable medium include identifying training data comprising target time series data and candidate time series data corresponding to a plurality of candidate metrics, predicting the target time series data based on the candidate time series data using a prediction network that includes temporal attention weights corresponding to a plurality of rolling time windows and candidate attention weights corresponding to the plurality of candidate metrics, computing a loss function by comparing the target time series data with the predicted target time series data, and updating the temporal attention weights and the candidate attention weights based on the loss function.

DETAILED DESCRIPTION

Figure 1:
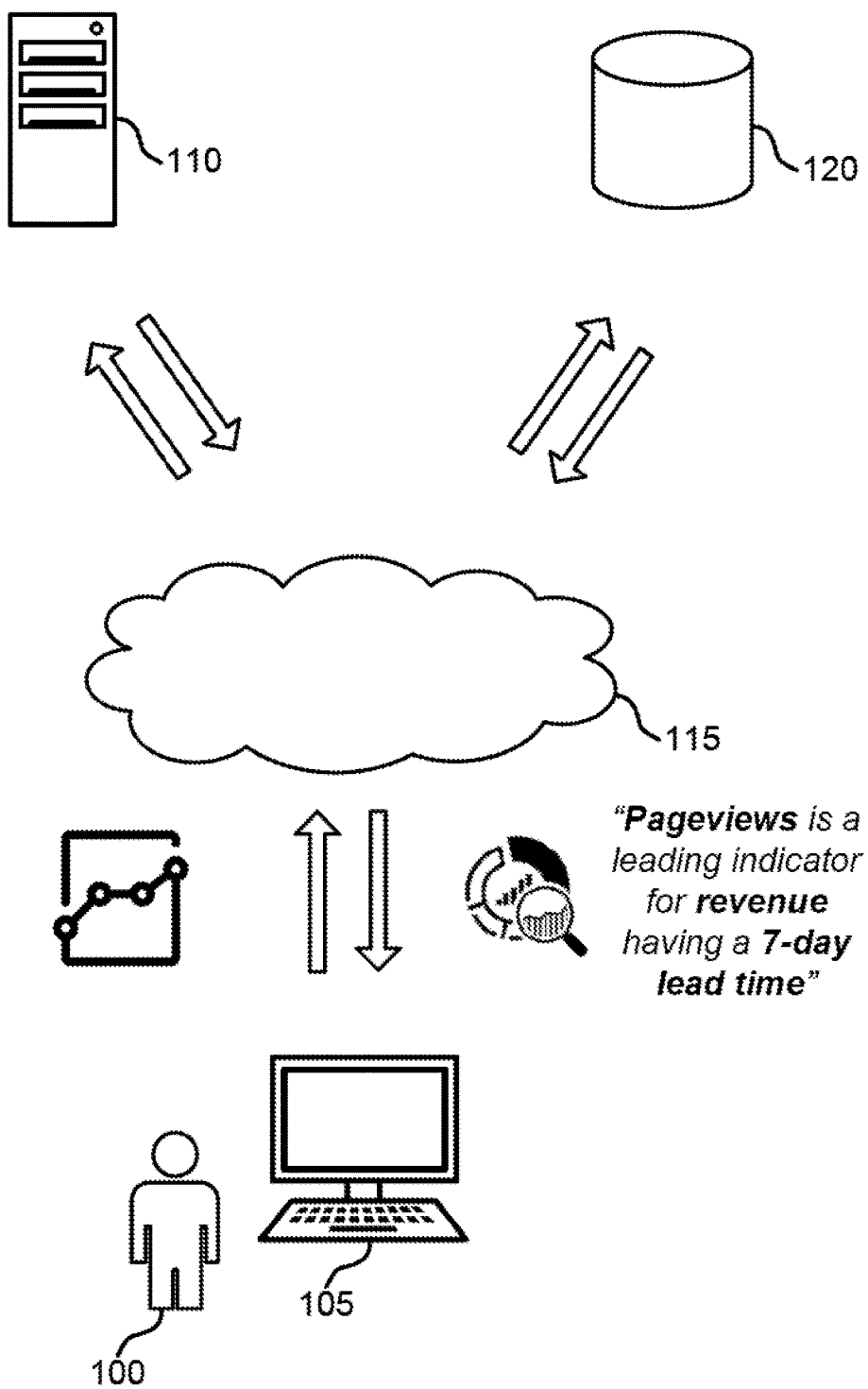
FIG. 1 shows an example of a data processing system according to aspects of the present disclosure.

The present disclosure describes systems and methods for data analytics. Some embodiments of the disclosure include a data processing apparatus configured to identify a leading indicator metric for target time series data from a large set of candidate metrics. For example, a machine learning model (i.e., a data processing network) is trained based on segmented candidate time series data (e.g., using rolling time windows). The trained network is then configured to calculate a lead time associated with the leading indicator metric. In some cases, a set of leading indicators are combined to form a composite leading indicator based on temporal attention weights and candidate attention weights. In some examples, the data processing network includes a two-level hierarchy architecture comprising a temporal attention head and a candidate attention head.

Data processing systems use indicators (e.g., return on sales, financial and operational ratios) to make business or market forecasts. Conventional systems make predictions by manually selecting indicators from a limited number of candidate metrics for target outcomes. Conventional systems are not able to determine the lead time associated with the leading indicators, because these systems have set a fixed lead time for each candidate time series. Additionally, these systems are not scalable to a fast-changing environment where datasets and available business-related indicators are evolving. Furthermore, it is not efficient to train a network by feeding a large amount of historical data regarding target time series irrespective of days to predict a target outcome on a subsequent day.

One or more embodiments of the present disclosure include a data processing apparatus that identifies one or more leading indicators and compute a lead time associated with each of the leading indicators. A data processing network is configured to include a two-level hierarchy architecture comprising mixture attention to predict target time series data based on windowed candidate time series data (i.e., segmenting the candidate time series data based on a set of rolling time windows). The size of the rolling time windows can be tuned by a user. In an embodiment, a first layer of the data processing network includes parallel long short-term memory networks (LSTMs) for each candidate time series. Temporal attention weights correspond to the temporal importance weights of different timesteps for each of the candidate time series. However, embodiments of the present disclosure are not limited to LSTMs. Other RNN models can be used in the first layer of the data processing network. A second layer of the data processing network includes candidate attention weights corresponding to variable importance of each of the candidate metrics. The data processing network includes a two-level hierarchy architecture. In some cases, the first layer and the second layer of the data processing network described herein are referred to as a first level and a second level of the two-level hierarchy architecture.

By applying the unconventional step of setting temporal attention weights corresponding to a set of rolling time windows and setting candidate attention weights corresponding to a set of candidate metrics, embodiments of the present disclosure include an efficient and scalable data processing network to predict target time series data. Embodiments of the present disclosure are robust to changing candidate time series data, size of rolling windows, and length of candidate time series. The data processing network can be trained relatively efficient on a windowed subset of candidate time series data.

Embodiments of the present disclosure may be used in the context of a business analytics application. For example, a data processing network based on the present disclosure may be used to identify a leading indicator metric for target time series data. Business decision-makers can make strategic decisions based on the identified leading indicator and the respective lead time. An example application in the business analytics context is provided with reference to FIGS. 1 and 2. Details regarding the architecture of an example data processing apparatus are provided with reference to FIGS. 3 and 4. Examples of a process for training a data processing network are provided with reference to FIGS. 5 and 6.

The term "leading indicator metric" refers to a metric whose measure values are useful in predicting a target metric. According to embodiments of the disclosure, a leading indicator metric can be selected based on time series data collected in the past to predict futured values of a target metric.

The term "time series data" refers to information that includes multiple values for a metric, where each of the values is associated with a time. In some cases, the values correspond to an extended period of time, and in other cases the values are associated with a particular point in time. According to embodiments of the present disclosure, time series data collected for a variety of metrics (i.e., "candidate time series data") may be analyzed to determine if the data is useful for predicting a target metric.

The term "attention weights" refers to parameters of a neural network which indicate how much significance to apply to different input values. In some cases, the attention weights are learned during a training process. For example, "candidate attention weights" can be trained to indicate which candidate time series data is useful in predicting target time series data. Similarly, "temporal attention weights" can be trained based on candidate time series data and target time series data to determine which time periods of the candidate times series data are useful for predicting the target time series data.

Data Processing System

FIG. 1 shows an example of a data processing system according to aspects of the present disclosure. The example shown includes user 100, user device 105, data processing apparatus 110, cloud 115, and database 120.

In the example of FIG. 1, the user 100 provides candidate time series data to data processing apparatus 110, e.g., using a user device 105 communicating via the cloud 115. Data processing apparatus 110 may have access to target time series data (e.g., business revenue) and candidate time series data stored in a database 120. For example, the candidate time series data include data corresponding to each of a set of candidate metrics such as visits, pageviews, etc.

In some embodiments, data processing apparatus 110 includes training a prediction network to predict the target time series data (e.g., revenue) based on the candidate time series data by setting temporal attention weights corresponding to a set of rolling time windows and by setting candidate attention weights corresponding to the set of candidate metrics. As a result, data processing apparatus 110 can be trained more efficiently using a windowed subset of candidate time series data, rather than a large amount of historical data involving the target time series. The rolling time windows (e.g., 10 days) may be tuned by the user 100 based on tasks.

Accordingly, data processing apparatus 110 identifies a leading indicator metric for the target time series data from the set of candidate metrics based on the temporal attention weights and the candidate attention weights. In the example of FIG. 1, the leading indicator metric for business KPI (revenue) is pageviews (i.e., pageviews have more influential impact on revenue than other candidate metrics). Data processing apparatus 110 also calculates a lead time of 7 days associated with pageviews. The user 100 (e.g., company executive) can take preventive action to influence pageviews such that company revenue does not fall short in 7 days. In some examples, more than one leading indicators may be identified. Then, data processing apparatus 110 signals the leading indicator metric for the target time series data to the user 100.

The user device 105 may be a personal computer, laptop computer, mainframe computer, palmtop computer, personal assistant, mobile device, or any other suitable processing apparatus. In some examples, the user device 105 includes software that incorporates a data analytics application (e.g., a data processing system). The data analytics application may either include or communicate with the data processing apparatus 110.

Data processing apparatus 110 includes a computer implemented network comprising a prediction network, a training component, and a leading indicator component. The network receives target time series data and candidate time series data, where the candidate time series data includes data corresponding to each of a set of candidate metrics. A training component is used to train a prediction network to predict the target time series data based on the candidate time series data by setting temporal attention weights corresponding to a set of rolling time windows and by setting candidate attention weights corresponding to the set of candidate metrics. The network identifies a leading indicator metric for the target time series data from the set of candidate metrics based on the temporal attention weights and the candidate attention weights. The network signals the leading indicator metric for the target time series data.

Data processing apparatus 110 may also include a processor unit and a memory unit. Additionally, data processing apparatus 110 can communicate with the database 120 via the cloud 115. In some cases, the architecture of the data processing network is also referred to as a network model or a network. Further detail regarding the architecture of data processing apparatus 110 is provided with reference to FIGS. 3 and 4. Further detail regarding the training of data processing apparatus 110 is provided with reference to FIGS. 5 and 6.

In some cases, data processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
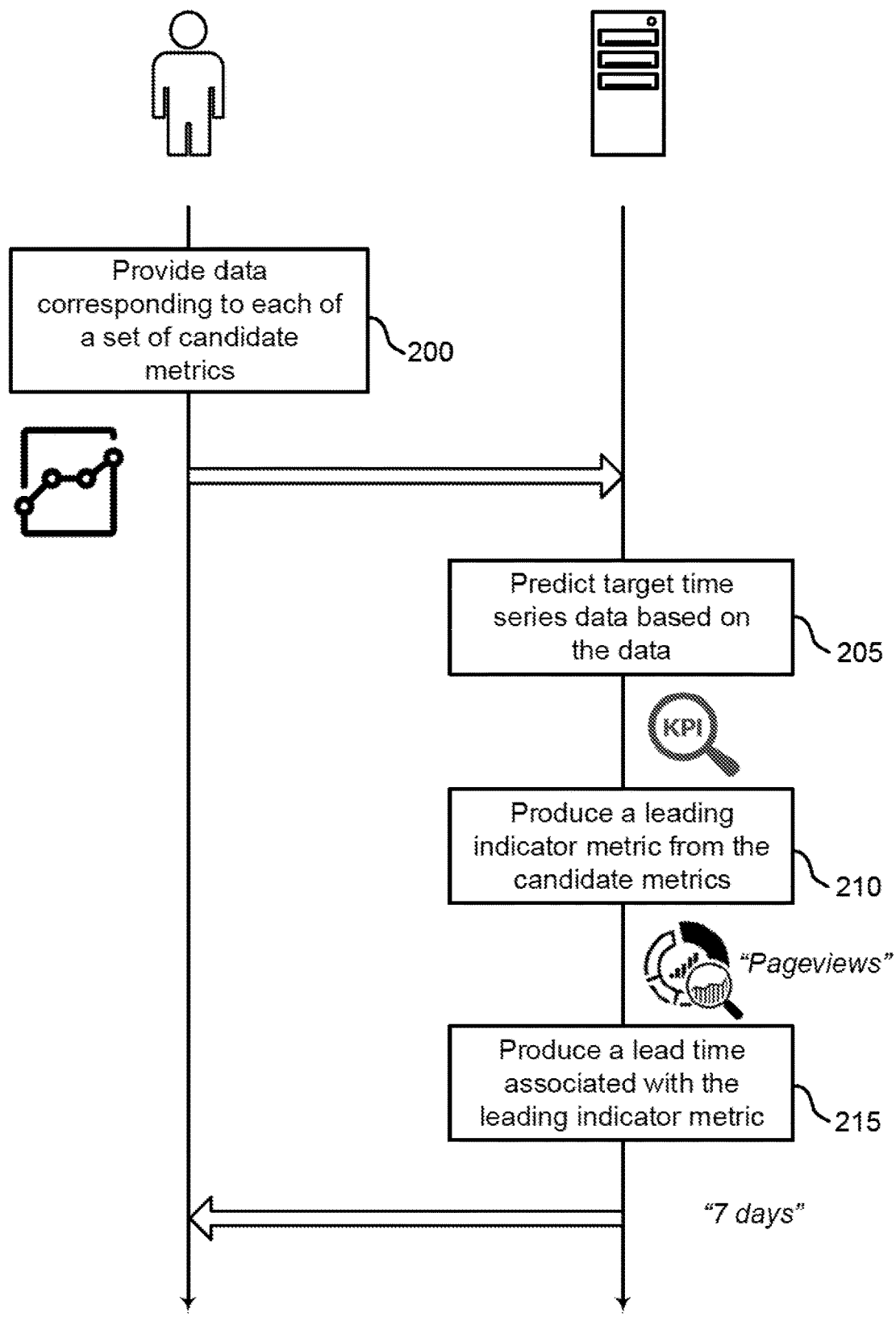
FIG. 2 shows an example of a leading indicator prediction process according to aspects of the present disclosure.

FIG. 2 shows an example of a leading indicator prediction process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the user provides data corresponding to each of a set of candidate metrics. According to an example, in a business setting, a relevant set of candidate metrics include pageviews, visits (e.g., visits to websites). Each of the candidate metrics forms candidate time series data over a period of time. In some cases, the operations of this step refer to, or may be performed by, a user as described with reference to FIGS. 1 and 2.

At operation 205, the system predicts target time series data based on the data. according to the example above, target time series data includes business key performance indicators (KPIs) such as orders, sales, revenue, and/or profit. KPIs are defined as quantifiable measures used by a business entity to see if it meets operational and strategic goals. In addition, KPIs offer predictive and prescriptive indicators. In some cases, orders, revenue, and similar examples are referred to as target KPIs. In some cases, the operations of this step refer to, or may be performed by, a data processing apparatus as described with reference to FIG. 1.

At operation 210, the system produces a leading indicator metric from the candidate metrics. In some cases, a leading indicator derived by the system are referred to as a leading indicator metric for the target time series data. One or more leading indicators are used for forecasting target label of business KPIs such as orders, revenue, etc. According to the example, pageviews may be considered and identified as a leading indicator. This means pageviews have a relatively important impact on target time series data (e.g., revenue). Business decision-makers should allocate more resources in increasing pageviews. In some cases, the operations of this step refer to, or may be performed by, a data processing apparatus as described with reference to FIG. 1.

At operation 215, the system produces a lead time associated with the leading indicator metric. The system is configured to automatically identify one or more leading indicators from the set of candidate metrics (e.g., pageviews, visits), and compute a lead time (e.g., 7 days) associated with each of the leading indicators. Business decision-makers can then take preemptive action based on the lead time. In some cases, the operations of this step refer to, or may be performed by, a data processing apparatus as described with reference to FIG. 1.

Network Architecture

Figure 3:
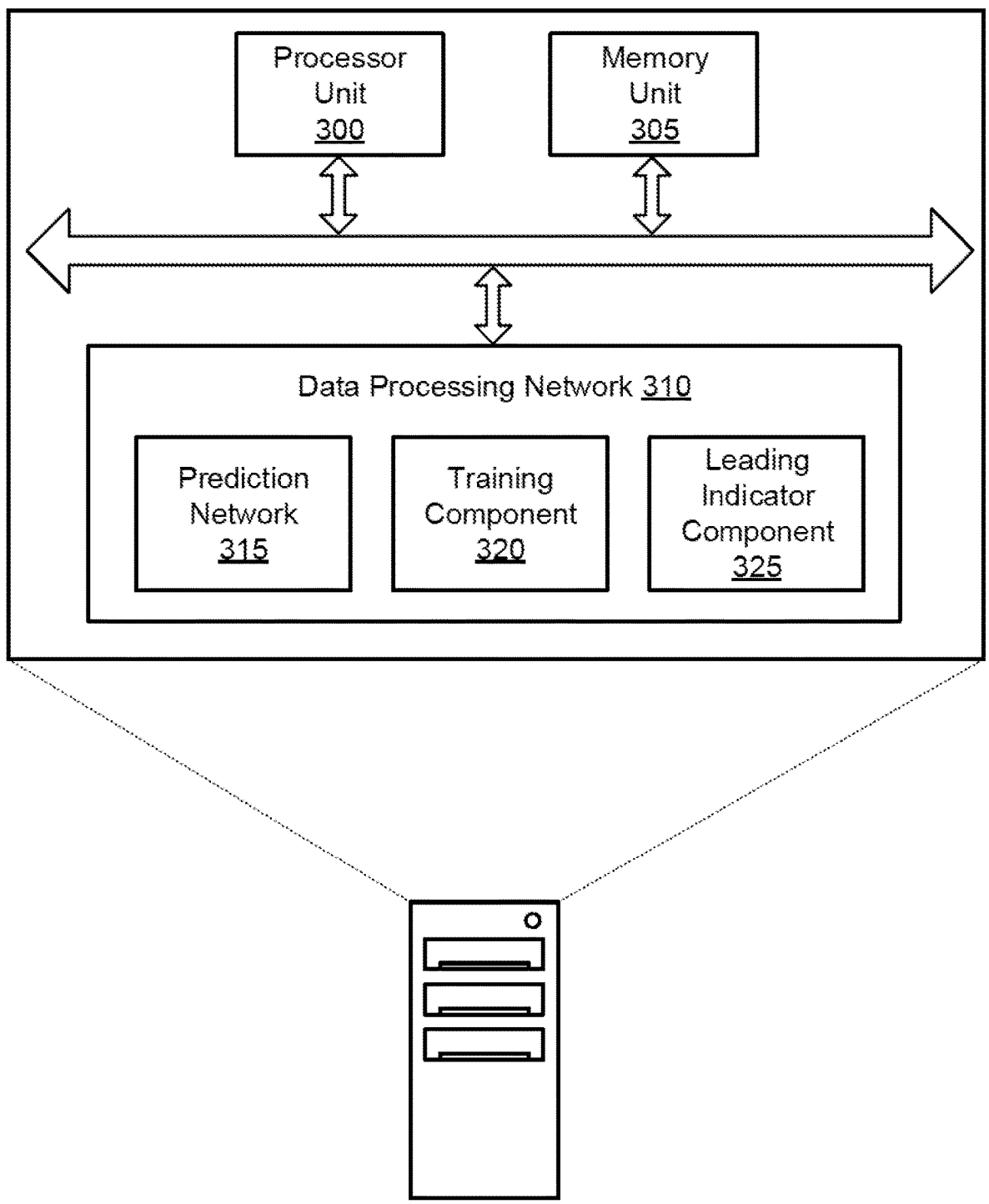
FIG. 3 shows an example of a data processing apparatus according to aspects of the present disclosure.
Figure 4:
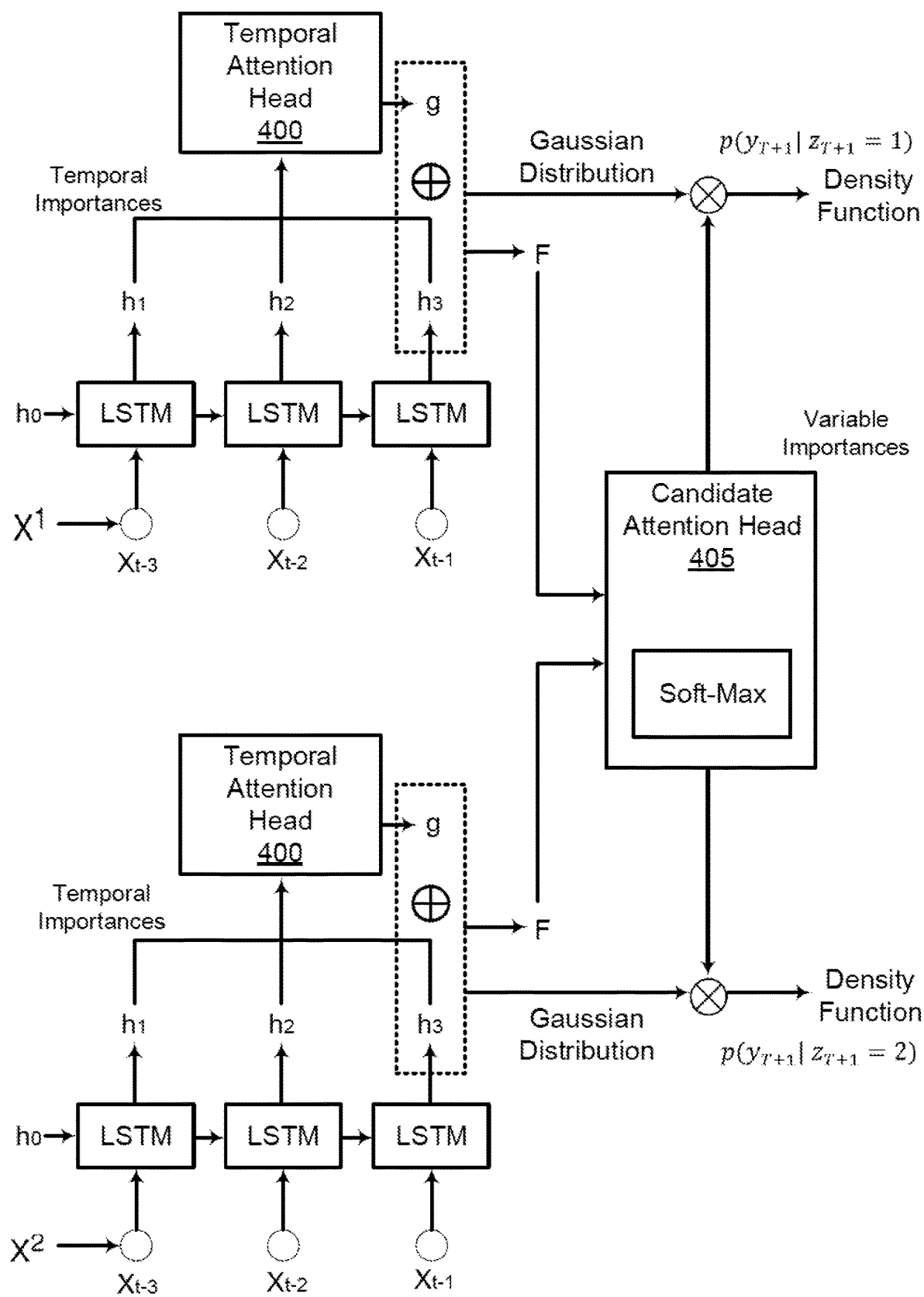
FIG. 4 shows an example of a data processing network according to aspects of the present disclosure.

In FIGS. 3-4, an apparatus and method for data analytics are described. One or more embodiments of the apparatus and method include a prediction network configured to predict target time series data based on candidate time series data corresponding to each of a plurality of candidate metrics, a training component configured to train the prediction network by updating temporal attention weights corresponding to a plurality of rolling time windows and candidate attention weights corresponding to the plurality of candidate metrics, and a leading indicator component configured to identify a leading indicator metric for the target time series data from the plurality of candidate metrics based on the temporal attention weights and the candidate attention weights.

In some examples, the prediction network comprises a temporal attention head in a first layer and a candidate attention head in a second layer. In some examples, the first layer comprises a plurality of parallel long short-term memory (LSTM) networks corresponding to the plurality of candidate metrics.

In some examples, the training component is configured to segment the candidate time series data based on the plurality of rolling time windows, wherein the training is based on the segmented candidate time series data.

FIG. 3 shows an example of a data processing apparatus according to aspects of the present disclosure. The example shown includes processor unit 300, memory unit 305, and data processing network 310.

A processor unit 300 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 300 is configured to operate a memory array using a memory controller. In other cases, a memory controller is integrated into the processor. In some cases, the processor unit 300 is configured to execute computer-readable instructions stored in a memory to perform various functions. In some embodiments, a processor unit 300 includes special purpose components for modem processing, baseband processing, digital signal processing, or transmission processing.

Examples of a memory unit 305 include random access memory (RAM), read-only memory (ROM), or a hard disk. Examples of memory unit 305 include solid state memory and a hard disk drive. In some examples, a memory unit 305 is used to store computer-readable, computer-executable software including instructions that, when executed, cause a processor to perform various functions described herein. In some cases, the memory unit 305 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 305 store information in the form of a logical state.

According to some embodiments of the present disclosure, the data processing apparatus includes a computer implemented artificial neural network (ANN) that identifies a leading indicator metric for a target time series data (e.g., business revenue, S&P500) from a set of candidate metrics. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, data processing network 310 includes performing macroeconomic forecasting through identifying leading or lagging indicators used to investigate outcomes (e.g., operations, engineering, finance) in an organization entity. Macroeconomic forecasting refers to the process of gathering data, analyzing data, and predicting future economic conditions based on certain criteria on a broad scale. Macroeconomic forecasting provides insight into the market trend and helps reduce uncertainty of environment by taking preemptive actions. For example, government officials and policy makers can adjust monetary policies based on the forecast.

According to some embodiments, data processing network 310 receives target time series data and candidate time series data, where the candidate time series data includes data corresponding to each of a set of candidate metrics. In some examples, data processing network 310 signals the leading indicator metric for the target time series data.

In one embodiment, data processing network 310 includes prediction network 315, training component 320, and leading indicator component 325. According to some embodiments, prediction network 315 produces a summarized contextual history for each of the candidate metrics based on the temporal attention weights. In some examples, prediction network 315 calculates the predicted target time series data using a density function based on a latent variable and a variable importance corresponding to each of the set of candidate metrics. In some examples, prediction network 315 filters the candidate attention weights to produce regularized candidate attention weights, where the leading indicator metric is identified based on the regularized candidate attention weights.

According to some embodiments, prediction network 315 is configured to predict target time series data based on candidate time series data corresponding to each of a set of candidate metrics. In some examples, the prediction network 315 includes a temporal attention head in a first layer and a candidate attention head in a second layer. In some examples, the first layer includes a set of parallel long short-term memory (LSTM) networks corresponding to the set of candidate metrics. Long short-term memory (LSTM) networks are a type of recurrent neural network (RNN) capable of learning order dependence in sequence prediction tasks. LSTM networks can be used for classifying, processing and making predictions based on time series data.

According to some embodiments, prediction network 315 predicts the target time series data based on the candidate time series data, where prediction network 315 includes temporal attention weights corresponding to a set of rolling time windows and candidate attention weights corresponding to the set of candidate metrics.

According to some embodiments, training component 320 trains a prediction network 315 to predict the target time series data based on the candidate time series data by setting temporal attention weights corresponding to a set of rolling time windows and by setting candidate attention weights corresponding to the set of candidate metrics. In some examples, training component 320 segments the candidate time series data based on the set of rolling time windows, where the training is based on the segmented candidate time series data. In some examples, training component 320 clusters a set of metrics. Additionally, training component 320 selects the candidate metrics based on the clustering. In some examples, each of the candidate metrics is selected randomly from a cluster of the metrics. In some examples, each of the candidate metrics is selected from a cluster of the metrics based on prior knowledge. In some examples, training component 320 identifies a predetermined number of time windows. Training component 320 then selects the set of rolling time windows based on the predetermined number of time windows. In some examples, training component 320 randomly initializes the temporal attention weights and the candidate attention weights. In some examples, training component 320 initializes the temporal attention weights and the candidate attention weights based on prior knowledge.

According to some embodiments, training component 320 is configured to train the prediction network 315 by updating temporal attention weights corresponding to a set of rolling time windows and candidate attention weights corresponding to the set of candidate metrics. In some examples, the training component 320 is configured to segment the candidate time series data based on the set of rolling time windows, where the training is based on the segmented candidate time series data.

According to some embodiments, training component 320 identifies training data including target time series data and candidate time series data corresponding to a set of candidate metrics. In some examples, training component 320 computes a loss function by comparing the target time series data with the predicted target time series data. In some examples, training component 320 updates the temporal attention weights and the candidate attention weights based on the loss function. In some examples, training component 320 clusters a set of metrics. Additionally, training component 320 selects each of the set of candidate metrics from a cluster of metrics based on the clustering. In some examples, training component 320 computes at least one of a mean square error (MSE) loss, a mean absolute error (MAE) loss, and a mean absolute percentage error (MAPE) loss, where the loss function includes the at least one of the MSE loss, the MAE loss, and the MAPE loss.

According to some embodiments, leading indicator component 325 identifies a leading indicator metric for the target time series data from the set of candidate metrics based on the temporal attention weights and the candidate attention weights. In some examples, leading indicator component 325 calculates a lead time associated with the leading indicator metric based on a look-ahead parameter and the temporal attention weights. In some examples, leading indicator component 325 generates a composite leading indicator as a weighted sum of a set of leading indicators, where weights of the composite leading indicator are based on the temporal attention weights and the candidate attention weights.

One or more embodiments of the present disclosure include methods and systems of using a measurable quantity (i.e., leading indicators) to predict a trend or process that results in significant changes (e.g., economical changes). Leading indicator component 325 is configured to identify one or more leading indicators as basis for forecasts and business decisions. In some examples, leading indicators come from a set of candidate metrics involving economic time series data. Individual or a subset of leading indicators are selected using human judgment from a large pool of candidate time series data corresponding to each of the candidate metrics. Network models are configured to fit to the candidate time series data to forecast a desired economic time series as a target label (i.e., target time series data), and appropriate leading indicators are then selected for monitoring the economics. Business decision-makers (e.g., digital marketers) face an uncertain environment and rely on one or more leading indicators to prepare for the future and take preemptive actions.

In some examples, performance measurement indices are used in the business context for monitoring and spurring growth. For example, key performance indicators (KPIs) are defined as quantifiable measures used by a business entity to verify against operational and strategic goals. In addition, KPIs offer predictive and prescriptive indicators (i.e., not rearview-mirror reviews). For example, leading indicators are used for forecasting target label of business KPIs such as orders, revenue, etc. Additionally, digital marketers use candidate time series data including data corresponding to each of various candidate metrics in use (e.g., visits, pageviews, etc.). The leading indicator metrics anticipates or explains the outcome and KPIs. Data processing network 310 applies a machine learning approach to automatically identify a leading indicator from candidate time series data including data corresponding to each of a set of candidate metrics, and compute a lead-time associated with a leading indicator metric. Furthermore, the lead-time is used for forecasting outcome or target time series.

According to an embodiment, data processing network 310 is configured to identify one or more leading indicators that forecast target time series data (e.g., business KPI), given a large set of time series involving candidate metrics. Data processing network 310 combines the leading indicators into a composite leading indicator, which forecasts the KPI. Data processing network 310 can compute the number of time periods by which the indicators lead the forecast time period and perform these tasks in a data-driven manner.

The tasks of identifying and combining leading indicators to forecast a KPI is challenging since candidate time series data is large and hand-crafted approaches do not perform well. Therefore, a composite of time series data (i.e., composite leading indicator) is obtained by combining a set of leading indicators, where the weights are learned from data. In some cases, knowledge of lead time and prediction function of leading indicators is useful in combining different candidate time series into a composite leading indicator because businesses prefer to forecast their target time series a few periods ahead. For example, the lead time for prediction associated with a candidate metric can vary from one time period (a period ahead forecast) to many time periods, and the lead time can change with respect to different candidate time series involving different candidate metrics. Unlike conventional systems (assumes a fixed lead time for each candidate time series), lead time calculated by the data processing network can vary across multiple candidate time series. Data processing network 310 applies a data-driven method to locate one or more leading indicators for predicting target time series while maintaining competitive prediction accuracy.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 4 shows an example of a data processing network according to aspects of the present disclosure. The example shown includes temporal attention head 400 and candidate attention head 405. In some embodiments, the data processing network includes an interpretable multi-variable model including one or more LSTMs.

According to an embodiment, a two-stage data processing network is applied on the time series where a first layer includes parallel LSTMs for each of candidate time series. Each LSTM results in a hidden state sequence output for that candidate time series. Attention is applied independent of the hidden sequence of each of the candidate time series and the attention weights correspond to the temporal importance of the timesteps for each candidate time series. The summarized contextual history for each candidate time series is generated through the concatenation of last hidden state vector (in the hidden state sequence) and the temporal attention weights for the candidate time series. A second layer of the data processing network includes attention applied to the final contextual history vectors from each candidate time series, using a latent variable.

According to an embodiment, $X^1$ is a first candidate time series corresponding to a first candidate metric. The multiple timesteps for the first candidate time series include $X_{t-3}^1$, $X_{t-2}^1$, and $X_{t-1}^1$. $X_{t-3}^1$, $X_{t-2}^1$, and $X_{t-1}^1$ are input to a LSTM model to produce hidden state sequence $h_1$, $h_2$, and $h_3$, respectively. Then, $h_1$, $h_2$, and $h_3$ are input to temporal attention head 400 to produce temporal attention weights g corresponding to temporal importance of the timesteps for the first candidate time series V. g is concatenated with last hidden state vector $h_3$ to produce a vector, F.

According to an embodiment, $X^2$ is a second candidate time series corresponding to a second candidate metric (i.e., different from the first candidate metric). The multiple timesteps for the second candidate time series may also include data corresponding to time periods $X_{t-3}^2$, $X_{t-2}^2$, and $X_{t-1}^2$. $X_{t-3}^2$, $X_{t-2}^2$, and $X_{t-1}^2$ are input to a LSTM model to produce hidden state sequence $h_1$, $h_2$, and $h_3$, respectively. Then, $h_1$, $h_2$, and $h_3$ are input to temporal attention head 400 to produce temporal attention weights g corresponding to temporal importance of the timesteps for the second candidate time series $X^2$. g is concatenated with last hidden state vector $h_3$ to produce the corresponding vector F. FIG. 4 is an example illustration of the two-stage data processing network (including temporal attention and variable attention). Embodiments of the present disclosure are not limited to two candidate metrics. In some examples, there are three or more candidate time series involving data corresponding to three or more candidate metrics.

According to an embodiment, both F (i.e., related to the first and the second candidate metric as illustrated in FIG. 4) are input to candidate attention head 405. Candidate attention head 405 includes a softmax function. The softmax function is used as the activation function of a neural network to normalize the output of the network to a probability distribution over predicted output classes. After applying the softmax function, each component of the feature map is in the interval (0, 1) and the components add up to one. These values are interpreted as probabilities. However, embodiments of the present disclosure are not limited to the use of softmax function.

According to an embodiment, a density function is calculated by using a Gaussian distribution parametrized by $[\mu_n, \sigma_n] = \phi_n(h_T^N \oplus g^N)$. This is the Gaussian distribution as illustrated in FIG. 4. In some examples, $\phi_n(\cdot)$ can be an arbitrary function or a feed forward neural network (e.g., a single layer neural network). The distribution parameters are not shared across candidate time series. The density function as shown in FIG. 4 is formulated as follows:

$$P(y_{T+1}|z_{T+1}=n, h_T^N \oplus g^n) \quad (1)$$

$Pr(z_{T+1}=n|h_T^1 \oplus g^1, \ldots, h_T^N \oplus g^N)$ is calculated by taking a softmax over $\{F(h_T^N \oplus g^n)\}_N$, where $F(\cdot)$ can be a feed forward neural network. Parameters of F are shared across a set of candidate time series data. In some embodiments, a mixture attention equation is formulated as follows:

$$p(y_{T+1}|X_T) = \sum_{n=1}^{N} p(y_{T+1}|z_{T+1}=n, X_T) \cdot Pr(z_{T+1}=n|X_T) \quad (2)$$

$$= \sum_{n=1}^{N} p(y_{T+1}|z_{T+1}$$

$$= n, h_1^n, \ldots, h_T^n) \cdot Pr(z_{T+1}=n|\tilde{h}_1, \ldots, \tilde{h}_T)$$

$$= \sum_{n=1}^{N} p(y_{T+1}|z_{T+1}$$

$$= n, \underbrace{h_T^n \oplus g^n}_{\text{Temporal attention}}) \cdot \underbrace{Pr(z_{T+1}=n|h_T^1 \oplus g^1, \ldots, h_T^N \oplus g^N)}_{\text{Variable attention}}$$

In the example illustrated in FIG. 4, the density function associated with the first candidate time series is $p(y_{T+1}|z_{T+1}=1)$. The density function associated with the second candidate time series is $p(y_{T+1}|z_{T+1}=2)$. In some examples, the data processing network includes LSTM neural networks, and the data processing network is configured to segment candidate time series data based on a rolling window. At every step, the data processing network computes a loss function. For example, a period of 365 days can be segmented to a set of rolling windows of 10 days. A user can tune the size of the rolling window. The network model takes a first day to a tenth day of a set of candidate time series (i.e., d1 to d10) and predicts the eleventh day (i.e., d11) of the target time series, for example, revenue. d1-d10 (a total of 10 days) data is used to predict the d11 day of the revenue. Then the network model takes d2-d11, and predicts the twelfth day (i.e., d12) revenue. Each of the 10 days is assigned a weight learned during training the network model. In an embodiment, the data processing network includes a two-level hierarchy network applied to each candidate time series, where a first layer (i.e., a first level) applies temporal attention on each day (i.e., to predict lead time) and a second layer (i.e., a second level) applies candidate attention on each candidate time series to predict target time series (i.e., determine leading indicators).

In one embodiment, the data processing network is configured to keep the weights of features or variables (candidate time series data) the same and checks for prediction error. This is referred to as a first modified model. In another embodiment, the data processing network constrains the important features or variables (candidate time series data) to the top five, from the set of candidate time series. This is referred to as a second modified model. In some examples, the top five are the top five features with the five highest weights, and each of the other weights is set equal such that the sum of all the weights add up to one. In some examples, the second modified model includes producing the top five features with the five highest weights while setting zero for the other weights. It may be extended to any top k, per user need.

A third modified model combines the first and the second modified models. One or more embodiments of the present disclosure can identify leading indicators for a target time series data (e.g., business KPI).

Training and Evaluation

Figure 5:
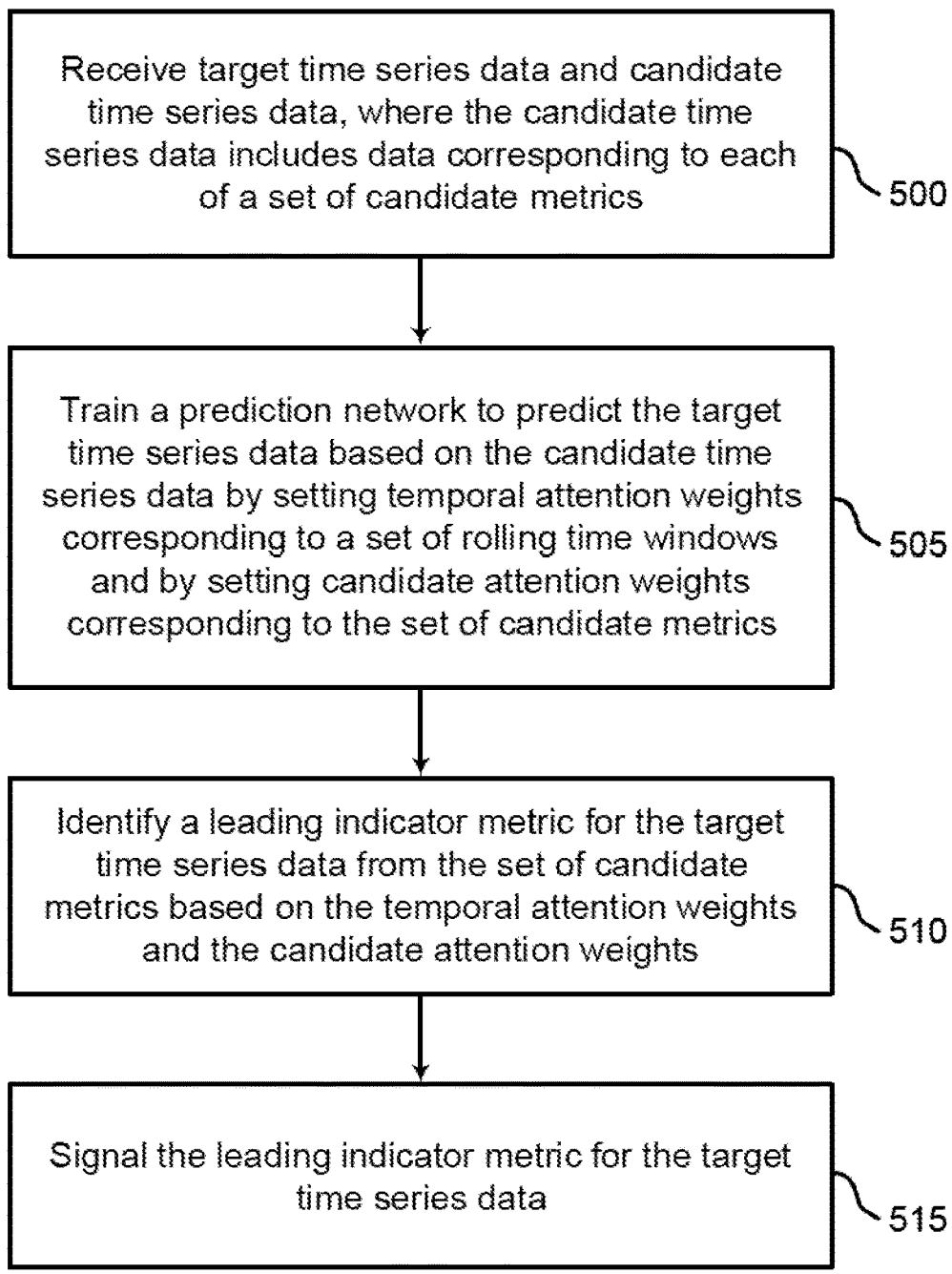
FIGS. 5 and 6 show examples of a process for training a data processing network according to aspects of the present disclosure.

In accordance with FIG. 5, a method, apparatus, and non-transitory computer readable medium for data analytics are described. One or more embodiments of the method, apparatus, and non-transitory computer readable medium include receiving target time series data and candidate time series data, wherein the candidate time series data includes data corresponding to each of a plurality of candidate metrics, training a prediction network to predict the target time series data based on the candidate time series data by setting temporal attention weights corresponding to a plurality of rolling time windows and by setting candidate attention weights corresponding to the plurality of candidate metrics, identifying a leading indicator metric for the target time series data from the plurality of candidate metrics based on the temporal attention weights and the candidate attention weights, and signaling the leading indicator metric for the target time series data.

Some examples of the method, apparatus, and non-transitory computer readable medium described above further include calculating a lead time associated with the leading indicator metric based on a look-ahead parameter and the temporal attention weights.

Some examples of the method, apparatus, and non-transitory computer readable medium described above further include generating a composite leading indicator as a weighted sum of a plurality of leading indicators, wherein weights of the composite leading indicator are based on the temporal attention weights and the candidate attention weights.

Some examples of the method, apparatus, and non-transitory computer readable medium described above further include segmenting the candidate time series data based on the plurality of rolling time windows, wherein the training is based on the segmented candidate time series data.

Some examples of the method, apparatus, and non-transitory computer readable medium described above further include clustering a plurality of metrics. Some examples further include selecting the candidate metrics based on the clustering.

In some examples, each of the candidate metrics is selected randomly from a cluster of the metrics. In some examples, each of the candidate metrics is selected from a cluster of the metrics based on prior knowledge.

Some examples of the method, apparatus, and non-transitory computer readable medium described above further include identifying a predetermined number of time windows. Some examples further include selecting the plurality of rolling time windows based on the predetermined number of time windows.

Some examples of the method, apparatus, and non-transitory computer readable medium described above further include randomly initializing the temporal attention weights and the candidate attention weights.

Some examples of the method, apparatus, and non-transitory computer readable medium described above further include initializing the temporal attention weights and the candidate attention weights based on prior knowledge.

Some examples of the method, apparatus, and non-transitory computer readable medium described above further include producing a summarized contextual history for each of the candidate metrics based on the temporal attention weights.

Some examples of the method, apparatus, and non-transitory computer readable medium described above further include calculating the predicted target time series data using a density function based on a latent variable and a variable importance corresponding to each of the plurality of candidate metrics.

Some examples of the method, apparatus, and non-transitory computer readable medium described above further include filtering the candidate attention weights to produce regularized candidate attention weights, wherein the leading indicator metric is identified based on the regularized candidate attention weights.

FIG. 5 shows an example of a process for training a data processing network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system receives target time series data and candidate time series data, where the candidate time series data includes data corresponding to each of a set of candidate metrics. In some cases, the operations of this step refer to, or may be performed by, a data processing network as described with reference to FIG. 3.

In some embodiments, the system receives candidate time series data from users. Alternatively or additionally, the system is configured to perform time series clustering and select one representative time series from each cluster. In some cases, the system includes a pre-processing step when a set of candidate time series is very large (e.g., size of the set of candidate time series is in the hundreds). Time series clustering can reduce the input to the network model into a smaller set of candidate time series. In some examples, one time series is randomly selected from each cluster. Different time series clustering algorithms are used which affect the selection of time series. For example, dynamic time warping (DTW) approach calculates distance for pairwise similarity of time series and then performs K-means. As an alternative, the time series which constitute clusters are selected and the remaining of the time series are grouped together into a large separate cluster. Experiments include showing both variations, i.e., one time series from each cluster, and all the time series that result into clusters.

One or more embodiments of the present disclosure use different datasets (e.g., public data, Adobe® proprietary data). In some examples, datasets include prices of stocks traded in New York Stock Exchange (NYSE) and Nasdaq. The target label is S&P500 index, a well followed bellwether of the stock market. The data processing network uses daily closing prices of a small subset of individual stocks to predict S&P500 (i.e., the network does not use all 500 stocks for prediction).

Another dataset includes sales record of a wide variety of product categories. The data spans 37 months, June 2017 to June 2020. The target time series for this data is revenue, although a user can choose any appropriate target time series.

One or more embodiments of the present disclosure use a relatively large set of initial time series, any of which can be a leading indicator for a target time series. The target time series data is provided by a user. Additionally or alternatively, the target time series data can be learned from a user's frequent choice of target time series from past behaviors if user's behavior log is accessible.

A user can select a set of candidate time series based on the user experience and knowledge. The network model is configured to prune the set of initial times series to a relatively small candidate set (i.e., candidate time series data involving fewer candidate metrics) in an unsupervised manner. This pre-processing step is described above (e.g., using time series clustering). For example, no knowledge of the target time series is used in the pruning process. The automated pruning/reduction increases computational efficiency if the set of time series to select the candidate set is initially large.

The target time series is used as specified by the user and the pruned candidate set is ingested. The network model is configured to search for a leading predictor for the target time series based on the candidate time series data, the weights of each candidate time series, and a respective lead time associated with each of the candidate time series to predict the target time series.

In some examples, the system uses time series and daily data in the pre-processing step. For example, each row represents a day, and data in the columns are stocks' prices, and candidate metrics may include visits, page views, etc. Each column includes a candidate time series corresponding to a candidate metric, where the network model predicts target time series based on the candidate time series. The target time series may be a stock market index (e.g., S&P500) or target includes revenue time series. However, embodiments of the present disclosure are not limited to the above-mentioned target time series and other targets can be selected, and data may be selected at a different granularity (e.g., hourly) for a different configuration.

At operation 505, the system trains a prediction network to predict the target time series data based on the candidate time series data by setting temporal attention weights corresponding to a set of rolling time windows and by setting candidate attention weights corresponding to the set of candidate metrics. In some cases, the operations of this step refer to, or may be performed by, a training component as described with reference to FIG. 3.

In some embodiments, moving windowed data (i.e., segmented time series data) is created as input to the network model, where each window is a set of successive time periods (i.e., number of days for daily data). Each window or segmented time series data is used to predict target at a future time step. The future time step can be one time period ahead (i.e., a day following the window) or several time periods ahead (i.e., multiple days following the window). In some cases, the lead time ahead (e.g., one day or multiple days) are also referred to as a look-ahead period. The choice of the size of window (i.e., the number of days) and look-ahead period for prediction are adjusted or customized by users. In some examples, the dataset is split into training, validation and testing dataset following an 80:10:10 ratio.

According to an embodiment, the data processing network includes a modified recurrent neural network (e.g., LSTM model) with mixture attention to predict target from windowed data (i.e., implementing rolling window as described above). The data processing network includes a two-level hierarchical network where a first layer (i.e., a first level) includes parallel LSTMs for each candidate time series. Each LSTM results in a hidden state sequence output for the candidate time series. Mixture attention is applied independent of the hidden sequence of each of the candidate time series. These attention weights correspond to the temporal importance weights of the timesteps for each candidate time series. The summarized contextual history for each candidate time series is obtained by concatenation of last hidden state vector (i.e., in the hidden state sequence) and temporal attention weights for the candidate time series. The second layer of the data processing network (i.e., a second level) includes attention applied to the final contextual history vectors from each candidate time series using a latent variable. In some cases, importance weights are initialized randomly, but these importance weights can be initialized based on prior relevant knowledge or conditions.

At operation 510, the system identifies a leading indicator metric for the target time series data from the set of candidate metrics based on the temporal attention weights and the candidate attention weights. In some cases, the operations of this step refer to, or may be performed by, a leading indicator component as described with reference to FIG. 3.

According to an embodiment, the data processing network outputs leading indicators, weights of these leading indicators contributing to the prediction task, and a respective lead time for each of the leading indicators. The weights of leading indicators can provide interpretability to the model output (e.g., relevancy, importance). In some examples, a user is able to understand and interpret which leading indicators have more influential impact than some other leading indicators based on the weights.

In some embodiments, the weights show that some time series (i.e., candidate time series data) contribute more than other time series in predicting stock market index (e.g., target time series data such as S&P500 index). For example, ticker AEP (American Electric Power), INTC (Intel), JNJ (Johnson & Johnson) representing distinct sectors (i.e., utility, technology, health) have relatively high influence on predicting S&P500. These stocks may be examples of leading indicators for S&P500.

In some examples, leading indicators are used for economic projections in an organization or taking strategic decisions such as new market expansion and allocation of resources to countries both for internal (operations, engineering, HR) and external (sales and marketing) functions. Organizations use indicators (e.g., return on sales, financial ratios, operational ratios), as leading and lagging indicators, prospectively for projections and retroactively for investigation of outcomes including operations, systems, engineering, finance, and marketing functions.

One or more embodiments of the present disclosure select leading indicators from candidate time series data (corresponding to respective candidate metrics) obtained from a set of time series that complements a target time series. The system uses non-target time series as leading indicators while maintaining prediction accuracy and performance of the target. Additionally, the data processing network is configured to automatically select a set of candidate time series (rather than hand-picked by a user of the system), where the selection is based on a large pool of time series. The data processing network enables qualitative interpretation for the user.

At operation 515, the system signals the leading indicator metric for the target time series data. In some cases, the operations of this step refer to, or may be performed by, a data processing network as described with reference to FIG. 3.

In some examples, the leading indicator stocks (e.g., AEP, INTC, JNJ) show that early temporal periods (i.e., t−10, t−9) have lower weights than latter temporal periods (i.e., t−2, t−1 which are closer to a target prediction period). Stock market index (i.e., S&P500) is affected more by prices of leading indicator stocks in periods close to a prediction period. By contrast, stocks such as PG (Procter & Gamble Co, consumer product sector) show flat weights, indicating S&P500 is impacted about equally over time by PG's stock prices in preceding ten days. In an embodiment, a composite leading indicator is defined as the weighted combination of candidate time series data. The candidate time series data includes data corresponding to each of a set of candidate metrics.

In some embodiments, a user may fetch and organize data with rows as units of time and columns as candidate time series of metrics. In some examples, the network model performs time series clustering on the whole set of time series, to select candidate time series data. Next, rolling windows are created, where each window includes a predefined number of successive days. Number of days is user-tunable (i.e., window size is user tunable). Given the target time series, and the set of candidate time series from above, the data processing network is configured to identify one or more leading indicator metrics. The data processing network includes a mixture-attention network. Alternative loss functions can be used per user choice. The data processing network is configured to predict the target time series. The data processing network signals the one or more leading indicators, outputs their weights and the lead time for prediction.

Figure 6:
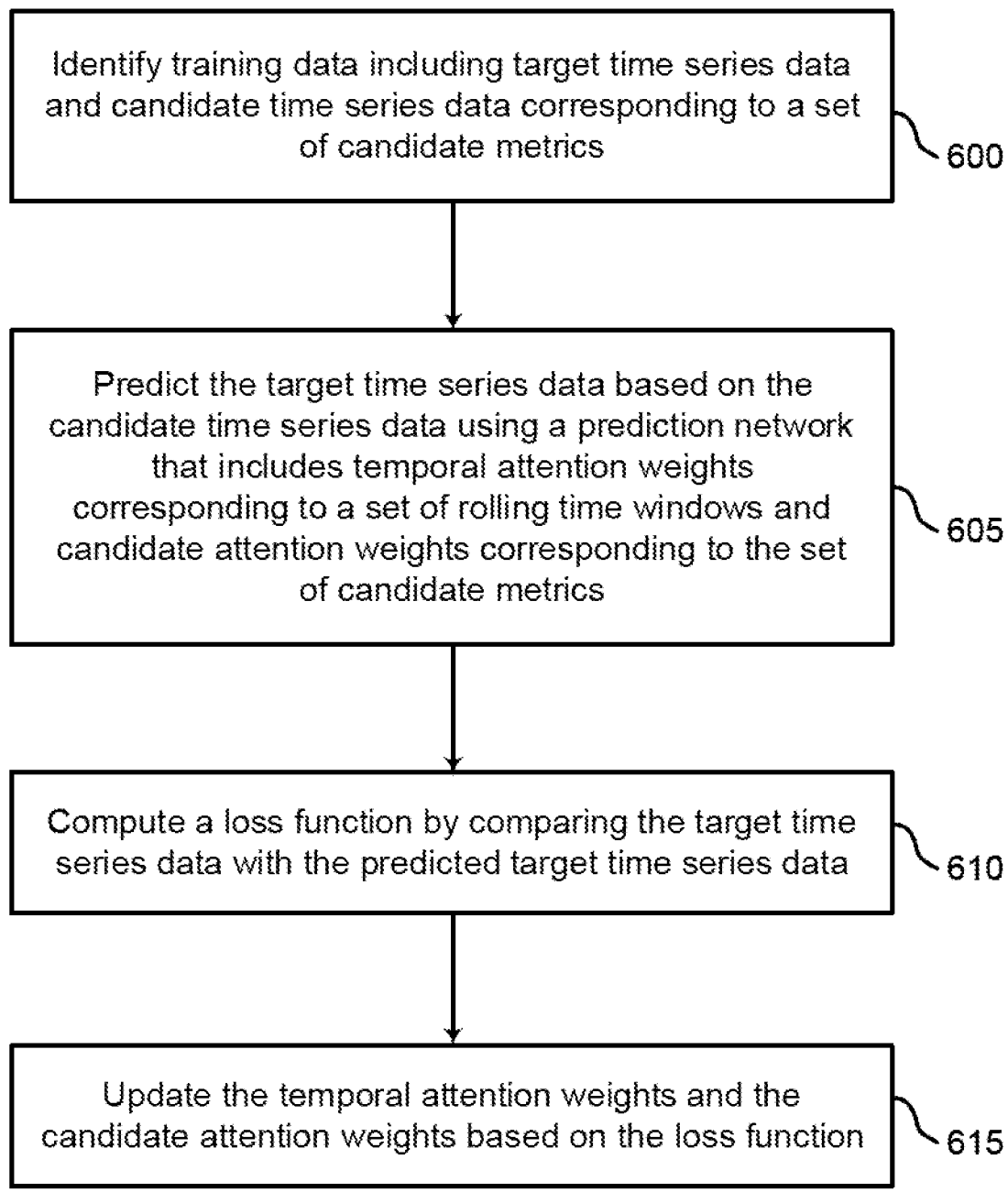

In accordance with FIG. 6, a method, apparatus, and non-transitory computer readable medium for training a network are described. One or more embodiments of the method, apparatus, and non-transitory computer readable medium include identifying training data comprising target time series data and candidate time series data corresponding to a plurality of candidate metrics, predicting the target time series data based on the candidate time series data using a prediction network that includes temporal attention weights corresponding to a plurality of rolling time windows and candidate attention weights corresponding to the plurality of candidate metrics, computing a loss function by comparing the target time series data with the predicted target time series data, and updating the temporal attention weights and the candidate attention weights based on the loss function.

Some examples of the method, apparatus, and non-transitory computer readable medium described above further include clustering a plurality of metrics. Some examples further include selecting each of the plurality of candidate metrics from a cluster of metrics based on the clustering.

Some examples of the method, apparatus, and non-transitory computer readable medium described above further include computing at least one of a mean square error (MSE) loss, a mean absolute error (MAE) loss, and a mean absolute percentage error (MAPE) loss, wherein the loss function includes the at least one of the MSE loss, the MAE loss, and the MAPE loss.

FIG. 6 shows an example of a process for training a data processing network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One or more embodiments of the present disclosure use supervised training techniques. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of a data processing network are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 600, the system identifies training data including target time series data and candidate time series data corresponding to a set of candidate metrics. In some cases, the operations of this step refer to, or may be performed by, a training component as described with reference to FIG. 3.

Experiments were conducted to evaluate the performance of the network model performance in predicting target time series on test data using a loss function (e.g., MAPE) compared to multiple baselines. However, embodiments of the present disclosure are not limited to MAPE loss, and other loss functions may also be used for training the data processing network. These baselines are commonly used for forecasting. Performance of the data processing apparatus is evaluated for different look-ahead time periods to evaluate potential performance deterioration. Additionally, weights of the indicators are evaluated to identify the important ones (i.e., leading indicators or leading indicator metrics). Furthermore, the data processing apparatus searches for the lead time associated with each important leading indicator time series.

For example, the data processing network selects a candidate set of 32 individual stocks randomly from a set of 500 stocks. The random selection avoids dependence on domain knowledge, which, if available may be used. The dataset includes daily closing prices for 9000 successive days (i.e., from year 1982 to year 2017) when the stock market was open. The target label for prediction is S&P 500. Ticker symbols of the candidate time series stocks include NOC, MCD, XRX, MRK, BMY, EMR, JNJ, etc.

At operation 605, the system predicts the target time series data based on the candidate time series data using a prediction network that includes temporal attention weights corresponding to a set of rolling time windows and candidate attention weights corresponding to the set of candidate metrics. In some cases, the operations of this step refer to, or may be performed by, a prediction network as described with reference to FIG. 3. In one example, a temporal window size of 10 days is selected (i.e., the temporal window size is a hyperparameter that can be selected or tuned by a user).

At operation 610, the system computes a loss function by comparing the target time series data with the predicted target time series data. In some cases, the operations of this step refer to, or may be performed by, a training component as described with reference to FIG. 3.

In some examples, a supervised training model includes a loss function that compares predictions of the data processing network with ground truth training data. The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

In some examples, one or more loss functions (e.g., MSE, MAE, MAPE or other loss functions) are used to evaluate model robustness and performance. Validation dataset is used on one or more of these loss functions as a stopping criterion for training. For example, the loss function of the network model (i.e., MAPE) is 2.5%, which outperforms baseline loss function (i.e., MAPE) as 6.6% of ARIMA (0,1,0) in the prediction task. Other variations of ARIMA produce higher loss function (i.e., MAPE) values than the network model. One or more embodiments of the present disclosure can indicate or identify leading indicators while maintaining competitive predicted performance that meets benchmark MAPE performance.

At operation 615, the system updates the temporal attention weights and the candidate attention weights based on the loss function. In some cases, the operations of this step refer to, or may be performed by, a training component as described with reference to FIG. 3.

Performance of apparatus, systems and methods of the present disclosure have been evaluated, and results indicate embodiments of the present disclosure have obtained increased performance over existing technology. Example experiments demonstrate that the data processing network outperforms conventional systems.

In some examples, customer data is used for evaluating the performance of the data processing network. A temporal window size of 7 days is selected based on variation across days of a week in such data. A user can choose another window size or perform tuning.

One or more embodiments of the present disclosure include methods and systems that perform better than ARIMA and LSTMs, and comparable with VAR (vector autoregressive) model. The network model generates weights corresponding to each of candidate time series and temporal weights, indicating lead times with which each time series can influence the target.

MAPE values for different look ahead time periods (corresponding to respective lead time) are recorded and evaluated. The decrease in performance measured using the loss function (e.g., MAPE) for different look-ahead time periods is small. the network model is robust to the examined look-ahead period of three days and beyond (e.g., going from 3 days look ahead to 30 days increases MAPE from 30.5 to 32.2, by 1.7 percentage points). A user can experiment with different look-ahead periods to find the lead time with which the user can predict the target. There is a trade-off between the length of the look-ahead period and the accuracy of the forecast (i.e., a negative correlation). An earlier forecast (i.e., longer look-ahead) would have lower accuracy of prediction. A user may choose the trade-off that is appropriate for a task. The user can create different scenarios and update prediction closer to the target date of the prediction.

The data processing network can identify a leading indicator metric for the target time series data from the set of candidate metrics based on the temporal attention weights and the candidate attention weights. In some examples, the weights show that some metrics contribute more than others in predicting movements in a target time series (e.g., revenue). For example, tool name instances, number of products, product click view, and orders have high influence in predicting revenue. These metrics are examples of leading indicators for the target time series (i.e., revenue).

One or more embodiments of the present disclosure identify leading indicators from available candidate metrics for a target time series (e.g., business KPIs, revenue). Leading indicator metrics may be used as a tool for interpreting target KPIs. The network model can estimate lead time for each leading indicator and the weights for combining the leading indicators to form a composite leading indicate which is then used to forecast or predict the target time series. In some examples, indicators (candidate metrics) that provide redundant information, or do not contribute to predicting target time series are pruned from database.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A computer-implemented method of data analytics, comprising:
receiving training data including target time series data and candidate time series data, wherein the candidate time series data includes data corresponding to each of a plurality of candidate metrics;
initializing, by a processor, a machine learning model comprising a recurrent neural network (RNN), a temporal attention head, and a candidate attention head;
training, by the processor using the training data, the machine learning model to predict time series data by updating temporal attention weights of the temporal attention head corresponding to a plurality of rolling time windows and by updating candidate attention weights of the candidate attention head corresponding to the plurality of candidate metrics;
computing, using the machine learning model, a sequence of hidden state vectors using the RNN;
computing, using the machine learning model, a temporal attention output based on the sequence of hidden state vectors using the temporal attention head;
computing, using the machine learning model, a variable importance output based on the temporal attention output using the candidate attention head;
computing, using the machine learning model, a leading indicator metric for the target time series data based on the temporal attention weights and the candidate attention weights;
collecting additional training data based on the leading indicator metric; and
updating, by the processor using the additional training data, parameters of the machine learning model.

2. The method of claim 1, further comprising:
calculating a lead time associated with the leading indicator metric based on a look-ahead parameter and the temporal attention weights.

3. The method of claim 2, further comprising:
generating a composite leading indicator as a weighted sum of a plurality of leading indicators, wherein weights of the composite leading indicator are based on the temporal attention weights and the candidate attention weights.

4. The method of claim 1, further comprising:
segmenting the candidate time series data based on the plurality of rolling time windows, wherein the training is based on the segmented candidate time series data.

5. The method of claim 1, further comprising:
clustering a plurality of metrics; and
selecting the candidate metrics based on the clustering.

6. The method of claim 5, wherein:
each of the candidate metrics is selected randomly from a cluster of the metrics.

7. The method of claim 5, wherein:
each of the candidate metrics is selected from a cluster of the metrics based on prior knowledge.

8. The method of claim 1, further comprising:
identifying a predetermined number of time windows; and
selecting the plurality of rolling time windows based on the predetermined number of time windows.

9. The method of claim 1, further comprising:
randomly initializing the temporal attention weights and the candidate attention weights.

10. The method of claim 1, further comprising:
initializing the temporal attention weights and the candidate attention weights based on prior knowledge.

11. The method of claim 1, further comprising:
producing a summarized contextual history for each of the candidate metrics based on the temporal attention weights.

12. The method of claim 1, further comprising:
calculating the predicted time series data using a density function based on a latent variable and a variable importance corresponding to each of the plurality of candidate metrics.

13. The method of claim 1, further comprising:
filtering the candidate attention weights to produce regularized candidate attention weights, wherein the leading indicator metric is identified based on the regularized candidate attention weights.

14. An apparatus for data analytics, comprising:
one or more processors; and
one or more memories comprising instructions executable by the one or more processors to:
initialize a machine learning model comprising a recurrent neural network (RNN), a temporal attention head, and a candidate attention head;
train, using training data including target time series data and candidate time series data, the machine learning model to predict time series data by updating temporal attention weights of the temporal attention head corresponding to a plurality of rolling time windows and by updating candidate attention weights of the candidate attention head corresponding to a plurality of candidate metrics;
compute, using the machine learning model, a sequence of hidden state vectors using the RNN;
compute, using the machine learning model, a temporal attention output based on the sequence of hidden state vectors using the temporal attention head;
compute, using the machine learning model, a variable importance output based on the temporal attention output using the candidate attention head;
compute, using the machine learning model, a leading indicator metric for the target time series data based on the temporal attention weights and the candidate attention weights;
collect additional training data based on the leading indicator metric; and
update, using the additional training data, parameters of the machine learning model.

15. The apparatus of claim 14, wherein:
the machine learning model comprises the temporal attention head in a first layer and the candidate attention head in a second layer.

16. The apparatus of claim 15, wherein:
the first layer comprises a plurality of parallel long short-term memory (LSTM) networks corresponding to the plurality of candidate metrics.

17. The apparatus of claim 14, wherein the instructions are further executable to:
segment the candidate time series data based on the plurality of rolling time windows, wherein the training is based on the segmented candidate time series data.

* * * * *